(12) United States Patent
Kern et al.

(10) Patent No.: US 12,365,168 B2
(45) Date of Patent: *Jul. 22, 2025

(54) RECYCLABLE, COLLAPSIBLE TUBE WITH BARRIER PROPERTIES

(71) Applicant: HOFFMANN NEOPAC AG, Thun (CH)

(72) Inventors: Philippe Kern, Münsingen (CH); Andreas Geiger, Heimberg (CH)

(73) Assignee: HOFFMANN NEOPAC AG, Thun (CH)

( * ) Notice: Subject to any disclaimer, the term of this patent is extended or adjusted under 35 U.S.C. 154(b) by 421 days.

This patent is subject to a terminal disclaimer.

(21) Appl. No.: 17/404,515

(22) Filed: Aug. 17, 2021

(65) Prior Publication Data

US 2022/0032590 A1 Feb. 3, 2022

Related U.S. Application Data

(63) Continuation of application No. 16/976,278, filed on Aug. 27, 2020, now abandoned, which is a
(Continued)

(30) Foreign Application Priority Data

Aug. 26, 2020 (EP) .................................. 20192904

(51) Int. Cl.
*B32B 27/08* (2006.01)
*B32B 1/00* (2006.01)
(Continued)

(52) U.S. Cl.
CPC ................ *B32B 27/08* (2013.01); *B32B 1/00* (2013.01); *B32B 7/12* (2013.01); *B32B 27/306* (2013.01);
(Continued)

(58) Field of Classification Search
CPC .. B32B 27/08; B32B 1/00; B32B 7/12; B32B 27/306; B32B 27/32; B32B 2255/10;
(Continued)

(56) References Cited

U.S. PATENT DOCUMENTS 3,660,194 A 5/1972 Hoffmann et al.
5,342,684 A * 8/1994 Carespodi ................. B32B 7/14
428/347

(Continued)

FOREIGN PATENT DOCUMENTS

EP 2949465 A1 12/2015
EP 3482928 A1 5/2019
(Continued)

OTHER PUBLICATIONS

International Search Report for PCT Serial No. PCT/EP2019/072863 dated Apr. 20, 2020.
(Continued)

*Primary Examiner* — James C Yager
(74) *Attorney, Agent, or Firm* — McCormick, Paulding & Huber PLLC (57) ABSTRACT

For recyclability in a high value circular recycling material stream, a fluid-tight collapsible polyolefin container comprises a container body (5) formed of a container laminate (1) that is folded to a container-like body, sealed in the overlapping edge regions (2, 3) and coated with a sheathing (4) of polyolefin material to form the container body (5), said container body (5) being provided at one open end with a container head formed from polyolefin material. The container laminate (1) is a laminate having at least three layers, an inner polyolefin layer (6) and an outer polyolefin layer (8) and a barrier layer (7) sandwiched between the outer polyolefin layer (8) and the inner polyolefin layer (6), wherein the barrier layer (7) comprises at least one poly-
(Continued)

olefin comprising barrier foil like a monolayer foil (71) or a coextruded foil (72 with layers 72a, 72b) or a laminate thereof and wherein at least 90% of all polymers of the container are made of polyolefin of the same kind.

23 Claims, 4 Drawing Sheets

Related U.S. Application Data continuation-in-part of application No. PCT/EP2019/072863, filed on Aug. 27, 2019, application No. 17/404,515, filed on Aug. 17, 2021 is a continuation-in-part of application No. PCT/EP2019/072863, filed on Aug. 27, 2019.

(51) Int. Cl.
*B32B 7/12* (2006.01)
*B32B 27/30* (2006.01)
*B32B 27/32* (2006.01)
*B65D 35/02* (2006.01)
*B65D 65/40* (2006.01)
*B65D 65/42* (2006.01)

(52) U.S. Cl.
CPC .............. *B32B 27/32* (2013.01); *B65D 35/02* (2013.01); *B65D 65/40* (2013.01); *B65D 65/42* (2013.01); *B32B 2255/10* (2013.01); *B32B 2255/20* (2013.01); *B32B 2255/205* (2013.01); *B32B 2255/26* (2013.01); *B32B 2270/00* (2013.01); *B32B 2307/516* (2013.01); *B32B 2307/732* (2013.01); *B32B 2439/40* (2013.01)

(58) Field of Classification Search
CPC .......... B32B 2255/20; B32B 2255/205; B32B 2255/26; B32B 2270/00; B32B 2307/516; B32B 2307/732; B32B 2439/40; B32B 2250/04; B32B 2250/03; B32B 27/327; B32B 2250/05; B32B 2250/242; B32B 2250/246; B32B 2255/28; B32B 2307/718; B32B 2307/7242; B32B 2307/7265; B32B 2439/70; B32B 2439/80; B32B 2597/00; B32B 1/08; B29C 53/36; B65D 35/02; B65D 65/40; B65D 65/42

See application file for complete search history.

(56) References Cited

U.S. PATENT DOCUMENTS

| | | | |
|---|---|---|---|
| 5,622,263 A * | 4/1997 | Greenland | A45D 40/0087 206/823 |
| 2015/0352769 A1* | 12/2015 | Geiger | B65D 85/08 156/218 |
| 2018/0050854 A1* | 2/2018 | Franca | B29C 66/851 |
| 2018/0086545 A1* | 3/2018 | Gaston | B65D 75/5883 |

FOREIGN PATENT DOCUMENTS

| | | |
|---|---|---|
| WO | 2010135843 A1 | 12/2010 |
| WO | 2013004646 A1 | 1/2013 |
| WO | 2014040195 A1 | 3/2014 |

OTHER PUBLICATIONS

European Search Report for European Patent Application No. 20192904.9 dated Jan. 18, 2021.

* cited by examiner

RECYCLABLE, COLLAPSIBLE TUBE WITH BARRIER PROPERTIES

CROSS REFERENCES TO RELATED APPLICATIONS

This application is a continuation of U.S. patent application Ser. No. 16/976,278, filed Aug. 27, 2020, which is a bypass continuation in part of International Patent Application No. PCT/EP2019/072863, filed Aug. 27, 2019, this application is a bypass continuation in part of International Patent Application No. PCT/EP2019/072863, filed Aug. 27, 2019, and this application also claims priority to European Patent Application No. 20192904.9, filed Aug. 26, 2020, each of which is hereby incorporated by reference in its entirety.

TECHNICAL FIELD

The present invention relates to a barrier container, in particular a tube, and a barrier container laminate for manufacturing same. Such container and preferably such laminate can be recycled as such within existing mono-material recycling streams, i.e. without demanding technically challenging and costly material separation.

BACKGROUND ART

Flexible containers, such as collapsible tubes, for substances such as pastes, jellies, emulsions, liquids, foams, powders, etc., with barrier effect, i.e. that are at least partially gas-tight, such as air-tight, and liquid tight, and their production have been heretofore described.

For example U.S. Pat. No. 3,660,194 discloses a method of producing gas-tight and liquid-tight containers, especially collapsible tubes, wherein a stripe of plastic coated carrier foil, a tube laminate, is bent or wound into the shape of a substantially cylindrical tube, the longitudinal edges of the stripe being arranged in overlapping relationship to form a tube-like body. These longitudinal edges are then heat-sealed and coated with a sheath of plastic to form the tube body. The sheath of plastic covers the overlapping seams and provides a smooth continuous outer surface capable of receiving an imprint. Further, according to this document the amount of plastic material and application thereof to the surface of the tube-like body is controlled such that the outside surface of such tube body, when covered with the plastic sheathing possesses a shape and dimension substantially corresponding to the internal receiving wall of a mold cavity for heading the tube. The tube body, typically after having been cut into finite tube sections, is then inserted at one end into a mold cavity, the outside surface of such tube section snugly fitting in good sealing relationship against the internal receiving wall of the mold cavity. The inner wall of the tube section, at least at the end region thereof received in the mold cavity is freely exposed, so that when moldable material is introduced into the mold cavity it contacts such exposed inner wall, thereby producing a substantially radially directed force applied outwardly against the inner exposed wall of the tube body, urging the outer wall thereof into extreme sealing contact with the internal receiving wall of the mold cavity so that an extremely effective seal appears at the location where the tube section has been inserted into the molding cavity.

Also the container described in WO 2010/135843 comprises a container body formed of a tube laminate, said tube laminate having an at least partially fluid-tight carrier foil sandwiched between thermoplastic semi-rigid or rigid layer material. This tube laminate is folded to a container-like body and sealed in the overlapping edge regions to stabilize the container-like body. This container-like body is then coated with a sheathing of elastomeric thermoplastic material of the same kind or type as the foil material to form a container body that is provided at one open end with a container head formed from thermoplastic material of the same kind or type as the foil material.

All these former container comprise a laminate with a barrier layer, in particular a barrier layer made of aluminum, SiOx, AlxOy, ethyl vinyl alcohols (EVOH), cycloolefin copolymers (COC) and polyamide (PA). Best fluid-tightness is obtained with metal foils. These laminates or tubes, respectively, are not suitable for being recycled without laborious material separation.

WO 2013/004646 A1 describes a laminate that comprises a thin coating of sol-gel polyvinyl alcohol. However, due to the high solubility of polyvinyl alcohol in water, such material is problematic with regard to longtime stability in humid environment.

Therefore there is still a need for tubes and laminates for their production that are easily recyclable.

Abbreviations

PE=polyethylene
LLDPE=linear low density polyethylene 0.915-0.925 g/cm$^3$
mLLDPE=LLDPE from metallocene based catalyst polymerization route enabling high density of up to 0.940 g/cm$^3$ while retaining excellent optical properties such as transparency.
LDPE=low density polyethylene 0.910-0.940 g/cm$^3$
HDPE=high density polyethylene 0.941 g/cm$^3$
MDPE=medium density polyethylene 0.926-0.940 g/cm$^3$
PP=polypropylene
EVOH=ethylene vinyl alcohol copolymer
PVOH=polyvinyl alcohol
PA=polyamide
PET=polyethylene terephthalate
PVC=polyvinyl chloride
PVDC=polyvinylidene chloride
OTR=oxygen transmission rate
MDO=mono-axial/mono-directional oriented
OPP=oriented polypropylene
SF=solvent-free
PE-met=metallized PE foil
OPP-met=metallized OPP foil
AlxOy=aluminum oxide
SiOx=silicon oxide
PUR=polyurethane Definitions Container laminate, in particular tube laminate: foil suitable for the production of collapsible containers like tubes comprising a barrier layer laminated to a polyolefin foil on each of its sides.

Container body or tube body: container/tube like part without shoulder/head.

Collapsible container or tube: the final container with container or tube body and shoulder/head without closure. The collapsible container, especially tube, can have an open end for being filled opposite of the shoulder/head or it can be filled and—if filled via an open end—said open end sealed.

Barrier layer: encompasses all types of barrier foils optionally provided with one or more functional layers.

Barrier foil: an oriented plastics foil composed of one or more polymeric materials.

Monolayer foil: a barrier foil with one polymer layer only such as an OPP-foil or an MDO-PE-foil.

Coextruded foil: a barrier foil composed of different polymeric materials such as MDO-PE-foil with an internal barrier layer like an intermediate EVOH-layer and—in general—tie layers.

Barrier foil laminate: laminate of two or more barrier foils, said barrier foils optionally comprising one or more functional layers on at least one of their surfaces.

SUMMARY

Functionalized barrier foils: a monolayer barrier foil or a coextruded barrier foil or a barrier foil laminate comprising one of more functional layers on at least one of its surfaces in the case of monolayer foils and coextruded foils or one or more functional layers on at least one of its surfaces and/or one or more intermediate functional layers in case of barrier foil laminates.

Polyolefin of the same type or kind: polyolefin composed of the same monomer units, i.e. polyethylene, polypropylene, polybutylene etc. PEs of different densities such as LLDPE, LDPE, MDPE, HDPE are considered the same type or kind of PE as far as the recyclability in mono-material recycling streams is concerned.

DISCLOSURE OF THE INVENTION

Hence, it is a general object of the invention to provide a preferably gas-tight, such as air-tight, and liquid-tight collapsible container, especially a collapsible tube, that is made of thermoplastic material and that can be recycled in mono-material recycling streams without any separation step involved.

It is another object of the invention to provide a container body, especially a tube body, of a container such as a tube and/or a container laminate suitable for producing such a container/tube.

Now, in order to implement these and still further objects of the invention, which will become more readily apparent as the description proceeds, the collapsible container is manifested by the features that it comprises a container body formed of a container laminate, said container laminate being folded to a container-like body and sealed in the overlapping edge regions, said container-like body having an outer surface coated with a sheathing of polyolefin material to form the container body, said container body being provided at one open end with a shoulder/head formed from polyolefin material, wherein said container laminate is a laminate having at least three layers, an inner polyolefin layer and an outer polyolefin layer and a barrier layer sandwiched between the outer polyolefin layer and the inner polyolefin layer, wherein the barrier layer comprises at least one polyolefin comprising oriented barrier foil and wherein at least 90% by weight of the container are made of a polyolefin of the same kind.

In a preferred embodiment, the inside of the container that upon use is in contact with the filled-in goods has an inert surface.

The barrier layer makes the collapsible container air-tight and liquid-tight (further on referred to as fluid-tight), allowing for shelf-life extension of packed goods. In order to obtain an increased fluid-tightness, the barrier foil comprised in the barrier layer can be provided with one or more functional layer(s) on at least one of its surfaces. Such functional layers are metal layers, metal oxide layers, ceramic layers and barrier lacquer layers. In order to reduce the risk that the container content might come into contact with e.g. the metallization or the metal oxide layer of a functionalized barrier foil even when, for instance, the polyolefin layer applied to the barrier foil is defective or, for instance, contains pores or openings, or in order to further improve the air-tightness of the barrier foil it can be desirable to provide the barrier foil with a barrier lacquer between the side of the container laminate forming the inner side of the container body and the metal or metal oxide or ceramic layer. Such lacquer can e.g. be on the same side of the barrier foil as the metal or metal oxide or ceramic layer or on the opposed side.

For the desired recyclability the container body has to be of polyolefin of the same kind in an amount of at least 90 weight-%, preferably at least 95 weight-% referred to the weight of the container and preferably of the container body alone. Further recommendations for good recyclability are:

TABLE 1

Demands for polyolefin recycling of flexible containers

| | |
|---|---|
| base polymer to be selected from | ≥90% PE or ≥90% PP, ideally ≥ 95% |
| polyamide | ≤5% tolerated |
| PET, PVC, PVDC, biodegradable or compostable polymers | not tolerated |
| paper | not tolerated |
| Al foil | not tolerated |
| barrier materials like EVOH, PA, acrylic, PVOH, SiO$x$, Al$x$O$y$, metallization, water based coatings | ≤5% tolerated |
| Density | <0.995 g/cm3 |
| Polyurethane and acrylic based adhesives | 5% tolerated |
| additives and fillers | OK if minimized |
| Print, inks, lacquers | ≤5% tolerated |
| labels | Only if same material as base polymer |

TABLE 2

Demands for polyolefin recycling of rigid containers

| | |
|---|---|
| base polymer to be selected from | ≥90% PE or ≥90% PP, ideally ≥ 95% |
| PET, PVC, PVDC, biodegradable or compostable polymers | not tolerated |
| paper | not tolerated |
| Al foil | not tolerated |
| barrier materials like EVOH, PA, acrylic, PVOH, SiO$x$, Al$x$O$y$, metallization, water based coatings | EVOH ≤ 5% tolerated; others to be minimized. |
| Density of PE mixture | 0.940 ≤ density ≤ 0.995 g/cm3 |
| Melt flow index of PE mixture | 0.2-0.9 g/10 min (ISO 1133 (190° C./2.16 kg) |
| Polyurethane and acrylic based adhesives | to be minimized |
| additives and fillers | OK if minimized |
| Print, inks, lacquers | to be minimized |
| labels | Only if same material as base polymer |

While for the manufacturing of barrier tubes a high amount of good sealable polyolefin like LDPE or LLDPE is preferred, it has turned out that present mechanical recycling processes can easier deal with tubes if they are recycled as rigid containers. Rigid containers, however, demand a high amount of rigid polyolefin like HDPE with defined melt flow rate (190° C./2.16 kg) of e.g. 0.2-0.9 g/10 min (ISO 1133-1 as valid in May 2018) for processing recycled PE (re-granulate) via a blow molding process being a standard technology for production of rigid PE containers.

In a preferred embodiment the container laminate itself already meets the criteria indicated in Tables 1 and 2 above, i.e. at least 90 weight-%, preferably at least 95 weight-% referred to the weight of the container laminate are of a polyolefin of the same kind.

The barrier foils are oriented foils based on polyolefins. Dependent on the demanded fluid-tightness, different embodiments of the barrier layer are preferred. The polyolefin comprising and oriented barrier foil can be a monolayer foil or a coextruded foil comprising at least two different materials. The polyolefin comprising barrier foil can be provided with a metal layer or a metal oxide layer or a ceramic layer on one or both sides and/or with a barrier lacquer layer. In case of critical content of a tube, such as in case of pharmaceuticals, it is preferred that a possible metal or metal oxide layer is on the side of the barrier foil directed towards the outside of the tube body and therefore it is preferred to have a barrier lacquer applied on the inner side of the barrier foil or on the outer side between the barrier foil and the metal or metal oxide layer, although for other applications a sequence "polyolefin comprising barrier foil—metallization or metal oxide or ceramic layer—barrier lacquer" may be preferred. Such optionally functionalized barrier foils can be the barrier layer in the container laminate.

In an alternative embodiment two or more optionally functionalized barrier foils of the same or different type can be laminated by means of an adhesive to form a barrier foil laminate used as barrier layer in a container laminate.

The barrier layer can be a polyolefin comprising barrier foil, such as a polyolefin monolayer foil or a polymeric coextruded foil, or a barrier foil laminate composed of two or more barrier foils of same or different kind. The polyolefin comprising and oriented barrier foil can optionally also be provided with a functional layer, be it used as such or in a barrier foil laminate.

Some embodiments of such barrier layers are further detailed below:
  barrier foil—metal or metal oxide or ceramic layer
  barrier foil—barrier lacquer
  barrier foil—barrier lacquer—metal or metal oxide or ceramic layer
  barrier foil—metal or metal oxide or ceramic layer—adhesive layer
  barrier foil—metal or metal oxide or ceramic layer
  barrier foil—barrier lacquer—metal or metal oxide or ceramic layer—adhesive layer—barrier foil—metal or metal oxide or ceramic layer.

In the scope of the present invention, presently PE containers such as PE tubes are preferred.

A presently preferred monolayer foil is a mono-axial, also termed mono-directional, oriented (MDO) PE foil. Such foils are commercially available. In general such foils are produced in that, during the orientation process, a blown film is stretched between two rollers which run at different speeds.

MDO foils are ideally produced from PE, especially HDPE or MDPE or LLDPE, optionally from a mixture of HDPE and LLDPE or HDPE and MDPE or HDPE and LDPE.

An alternative foil is an oriented PP (OPP) foil. An OPP-foil in case of PE-tubes has the disadvantage that it is limited in thickness due to the demand that at least 90% of the container must be PE.

An advantage of OPP-foils is their commercial availability, e.g. from Jindal Films or Toppan. The disadvantage is that their thickness is limited in order to guarantee the limit of 10%. For PE-tubes with a OPP-foil sandwiched between two PE-foils of e.g. 70 µm a thickness of the OPP-foil of 15 to at most 20 µm, such as 16 to at most 20 µm, in case of a PE-sheathing of 40 µm is acceptable.

A presently preferred coextruded foil is e.g. a MDO-PE-EVOH-foil with an EVOH layer between two PE-layers. Such material has an improved air-tightness compared to a pure MDO material of the same thickness.

Such MDO foil with additional central barrier can be produced starting from a 5 layer co-extruded blown foil having the layers PE/tie/EVOH/tie/PE, wherein the tie layer is a modified polyolefin with functional groups, designed to bond to a variety of polyolefins, e.g. a maleic anhydride grafted LLDPE material. Said tie is applied in a thickness of 5-10 µm. In general an e.g. 60-100 µm blown foil is produced that directly after the blowing process is unidirectionally (monodirectionally) stretched. The stretching factor in general is 3 to 5. In case of a 60 µm foil stretched with a factor 3, a 20 µm MDO foil is obtained. By this process, the resulting EVOH internal barrier layer has a thickness of only about 1 to 3 µm which keeps the amount of non-PE materials very low with a nevertheless good oxygen-barrier effect. This good barrier effect is i.a. due to the enhanced crystallinity of the PE and EVOH materials due to the orientation of the MDO foil. Measurements of the barrier effect gave an OTR of approx. 10 ml/(m$^2$×d×bar) measured at 23° C./50% r.h. Compared to a not stretched PE foil without EVOH barrier (approx. 5000 ml/(m$^2$×d×bar)) this is a significant improvement.

A much preferred metal layer for metallization is aluminium and preferred ceramic and metal oxides are silicon oxides (SiOx) and aluminium oxides (AlxOy). A suitable thickness of a metallization, i.e. for obtaining a good barrier, is about 20-80 nm, such as 20-50 nm.

Suitable barrier lacquers are water insoluble lacquers, e.g. PVOH based, preferably lacquers with modified PVOH as sole polymer. PVOH barrier lacquers in general are used for reducing oxygen permeability. Due to their highly reduced water solubility they are also less swelling and therefore exhibit long lasting barrier effect. Enhanced water resistance can e.g. be achieved by modification such as esterification of acetate groups remaining from the production process. PVOH lacquers are usually applied in amounts resulting in a final (cured) weight of 1 to 3 g/m$^2$, or a thickness of about 1 to 3 µm, preferably 1 to 2 g/m$^2$, or a thickness of about 1 to 2 µm, such as about 1 g/m$^2$, or a thickness of about 1 µm.

Presently preferred polyolefin comprising barrier foils are commercially available, such as
  OPP-foils, preferably in a thickness of 15 to 20 µm, such as 16 to 20 µm on one side provided with an AlxOy or SiOx or metal, like aluminium, layer or thin film coating, respectively.

A barrier foil laminate can be obtained by laminating two or more barrier foils by means of an adhesive. In general two monolayer foils are laminated such as two OPP-foils, two MDO-PE-foils, or one MDO-PE-foil and one OPP-foil, or two coextruded foils like two MDO-PE-EVOH foils or one MDO-PE-EVOH foil with one MDO-PE-foil or one OPP-foil, wherein all barrier foils can be provided with one or more functional layer(s).

An example of a functionalized barrier foil laminate is composed of an OPP-foil with an AlxOy or SiOx layer on one side and an OPP-foil with a metal layer on one side, said foils being laminated together with an adhesive.

Suitable adhesives are polyurethane based, preferably solvent-free or water-based, respectively, adhesives. Such adhesives are preferably applied in an amount (dry weight) of 1 to 3 g/m$^2$ or about 1 to 3 µm such as about 1.5 g/m$^2$ or about 1.5 µm.

A presently less preferred alternative to the PUR based solvent-free or water-based adhesive are PUR based solvent-based laminating adhesive that have the disadvantage of liberating volatile organic compounds and in addition have to be applied in an amount of about 2.5 to 5 g/m$^2$.

The same adhesives in the same thickness range can also be used to laminate the barrier layer between two polyolefin foils. Preferred polyolefin foils are PE-foils formed in an extrusion blow-molding process or a coextrusion blow-molding process. Dependent on the intended use of the tube container, at least the inner foil may be made of or—in the case of a coextruded inner foil—have as innermost layer a layer of pharmaceutical grade polyolefin, preferably pharmaceutical grade PE.

The inner and/or the outer foil can independently of each other be mono-foils or coextruded foils. Coextruded foils can be coextruded foils of the same material but with different thicknesses such as 15 µm/30 µm/15 µm, or of material of the same kind but with different properties like densities such as LLDPE and HDPE or coextruded foils of different materials such as polyolefins and an internal barrier layer and preferably tie layers.

A preferred foil with an internal barrier layer sandwiched between two polyolefin layers is an EVOH layer sandwiched between two PE layers. In general such a foil is a five layer foil with PE-tie-EVOH-tie-PE. A suitable thickness of the EVOH layer is 6 to 8 µm. A suitable tie layer between the EVOH layer and the PE layer is maleic anhydride grafted LLDPE material with an independent thickness of 3 to 8 µm each, while the same thickness of both tie layers is presently preferred. The PE layers can be of PE with identical density or different densities. A suitable thickness of each PE-layer is 30-50 µm.

If not intended for recycling in the rigid container flow, a preferred material for the flexible outside foil is LDPE, although LLDPE and MDPE types can also be used as well as mixtures of HDPE and LLDPE.

For the sealable inside foil a mixture of HDPE and LLDPE or pure MDPE are ideally used. LDPE is less suitable since it results in a seal of limited strength. A very good sealable mixture comprises 30% HDPE and 70% LLDPE and optionally antiblock additives, being added as PE based masterbatches containing inert $SiO_2$ beads in the range of 5 µm in diameter.

For the inside foil of such a container, the use of a coextruded foil comprising an internal barrier layer such as an EVOH-layer of e.g. 3 to 8 µm between two PE layers of PE as specified above can be advantageous to reduce permeability of the inner film towards compounds of the content that might affect the adhesive and thus affect the life-time of the container.

In another embodiment, the inner and the outer side of the container laminate can be made of MDPE.

If intended for recycling in the rigid container flow the inner polyolefin foil can also be a mono-foil like a PE mono-foil or it can be a coextruded foil as described above, in particular a coextruded foil with internal barrier layer, like an EVOH-layer. For such recycling a high amount of HDPE is preferred. The PE foil or layers should comprise at least 80% HDPE. The further components may be lower density PE, in particular LDPE or LLDPE.

For good recyclability of the tubes via the rigid container route a low melt flow rate is preferred such as 0.2 to 0.9 g/10 min (190° C./2.16 kg; ISO 1133-1). Such foils are ideally produced by a blow molding process.

Irrespective of the recycling route, the overall thickness of the inner foil in general is about 60 to 100 µm, preferably 80 to 100 µm for a coextruded foil with internal barrier layer.

While also for recycling in the rigid container flow all kind of foils can be used as outer foils provided that the HDPE content is at least 80% with the remaining % being LDPE or LLDPE, if high transparency is desired, at least part of the HDPE in the outer foil can be replaced by LLDPE, especially mLLDPE with high density of e.g. 0.940 g/cm$^3$, in case of a multilayer foil with e.g. a colored intermediate layer also only in the outermost layer.

A presently preferred outer foil for the rigid container route is a three layer PE foil, such as a three layer foil with each layer having the same composition but different thickness or with at least one layer of higher LDPE or LLDPE content for better sealability, or the outermost layer may be of or comprise a high amount of mLLDPE for enhanced transparency. Also these foils preferably have a low melt flow rate such as 0.2 to 0.9 g/10 min (190° C./2.16 kg; ISO 1133-1). Such foils are ideally produced by a blow molding process.

Irrespective of the recycling route, the overall thickness of the outer foil in general is about 40 to 100 µm, preferably 50 to 70 µm.

Suitable container laminates have the following structure
polyolefin foil—adhesive—barrier layer composed of one or more optionally functionalized barrier foils—adhesive—polyolefin foil.

Such foils are preferably produced by a lamination procedure using a laminating adhesive as indicated above, preferably a solvent-free or water based PUR-based adhesive. The lamination procedure as such is performed as known to the skilled person.

Presently preferred polyolefin foils are PE-foils in particular PE-foils with a thickness of approx. 70 µm.

The shoulder/head of the tube container is made of PE if the polyolefin foils are PE based and of PP if the polyolefin foils are PP based. In case of PE, HDPE is a preferred shoulder/head material.

It is preferred to have PP closures for PP containers and PE closures for PE containers.

A method suitable and preferred for manufacturing fluid-tight containers or tubes of the present invention is essentially described in U.S. Pat. No. 3,660,194 that is incorporated herein by reference in its entirety. Said method has already been outlined in the state of the art chapter above.

BRIEF DESCRIPTION OF THE DRAWINGS

The invention will be better understood and objects other than those set forth above, will become apparent when consideration is given to the following detailed description thereof. Such description makes reference to the annexed drawings showing schematic sectional view through a tube foil or tube laminate, respectively, formed from the indicated foils (from inside to outside with a slash indicating an adhesive layer) wherein.

MODES FOR CARRYING OUT THE INVENTION

As indicated above, one subject matter of the present invention is a recyclable container, in particular a tube comprising a container, preferably a container body and most preferred a container laminate that is at least 90% PE or PP, in particular PE. Some presently preferred container laminates are shown in the Figures. In some embodiments the 90% polyolefins of one kind are only obtained for the container (laminate with sheathing and shoulder/head) or the container body (laminate with sheathing only).

Figure 1:
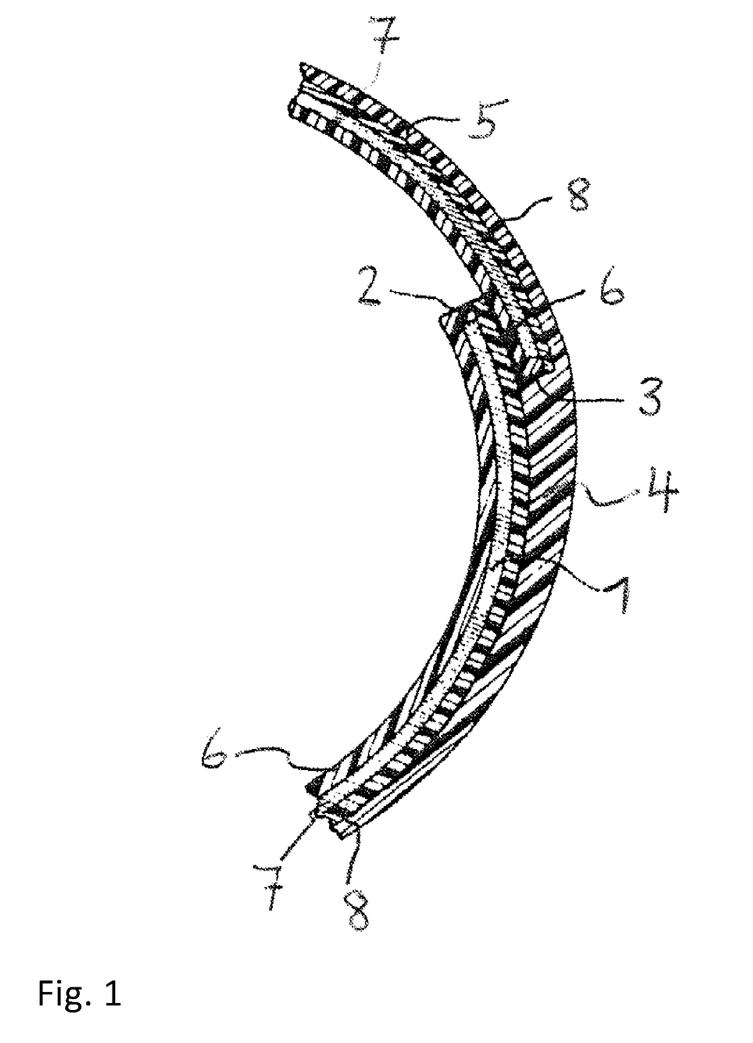
FIG. 1 is an enlarged fragmentary sectional view of the container or tube body prior to the heading thereof, and wherein the thickness of the various layers of the tube have been exaggerated appreciably for the purpose of clarity and simplification in explanation of the invention.

FIG. 1 is an enlarged fragmentary sectional view of the container or tube body showing the seam section wherein overlapping edges 2 and 3 of the container laminate 1 are sealed and wherein the whole body, in particular also the seal are coated with a sheathing 4. The container laminate 1 is shown as three layer material with an inner polyolefin layer 6, an outer polyolefin layer 8 and a barrier layer 7 sandwiched between these two layers.

Figure 2:
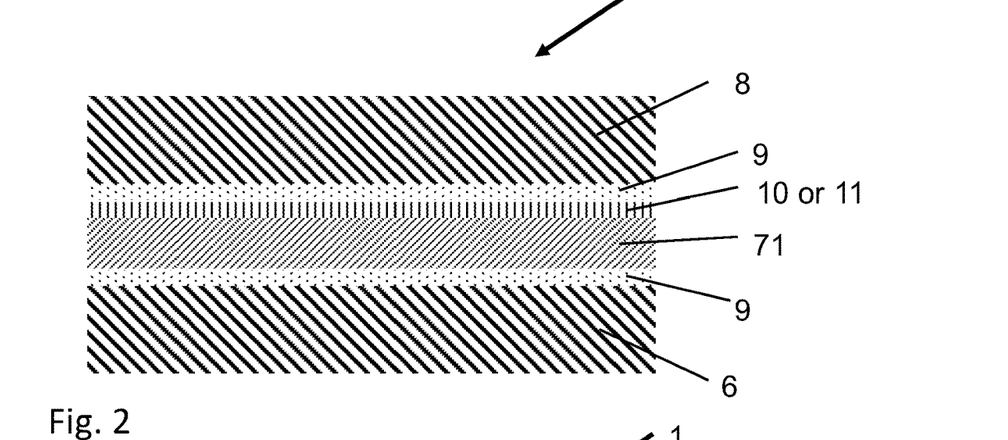
FIG. 2 is PE/MDO-PE+metallization (or metal oxide or ceramic)/PE.

FIG. 2 shows a container laminate 1 with—from inside to outside—PE 6/adhesive 9/MDO-PE 71+metallization 10 or metal oxide or ceramic layer 11/adhesive 9/PE 8.

A presently preferred embodiment of the above material with a thickness of approx. 160 μm is composed as follows from inside PE (6) to outside PE (8):

For the flexible route: 70 μm HDPE/LLDPE or HDPE/LDPE—SF polyurethane based adhesive (approx. 1.5 g/m$^2$)—20 μm MDO-PE with metallization—SF polyurethane based adhesive (approx. 1.5 g/m$^2$)—70 μm LDPE.

For the rigid route: 70 μm HDPE/LLDPE or HDPE/LDPE—SF polyurethane based adhesive (approx. 1.5 g/m$^2$)—20 μm MDO-PE with metallization—SF polyurethane based adhesive (approx. 1.5 g/m$^2$)—70 μm HDPE or mLLDPE or HDPE/LLDPE or HDPE/LDPE.

Figure 3:
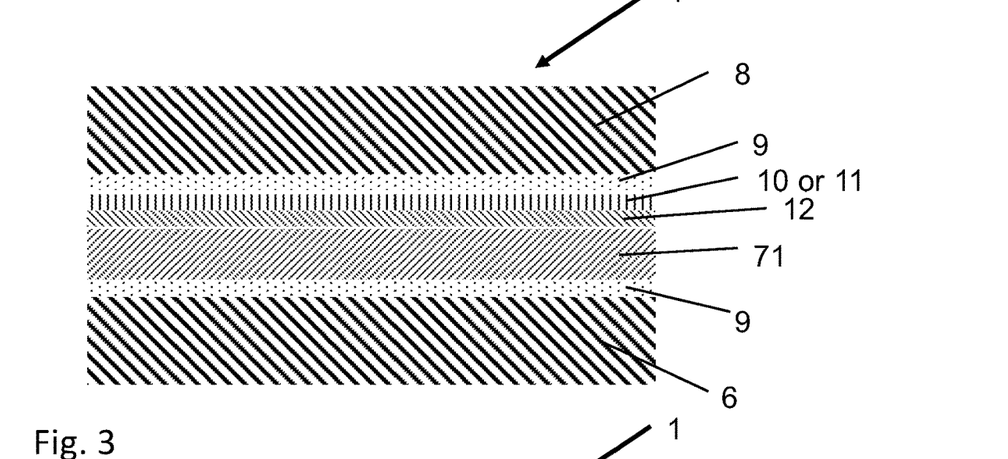
FIG. 3 is PE/MDO-PE+lacquer+metallization (or metal oxide or ceramic)/PE.

FIG. 3 shows a laminate with—from inside to outside—PE 6/adhesive/MDO-PE 71+lacquer 12+metallization 10 or metal oxide or ceramic layer 11/PE 8.

A presently preferred embodiment of the above material with a thickness of approx. 160 μm is composed as follows:

For the flexible route: 70 μm HDPE/LLDPE or HDPE/LDPE—SF polyurethane based adhesive (approx. 1.5 g/m$^2$)—20 μm MDO-PE with PVOH based barrier lacquer (approx. 1 g/m$^2$) and optional metallization 10 or metal oxide or ceramic layer 11—SF polyurethane based adhesive (approx. 1.5 g/m$^2$)—70 μm LDPE.

For the rigid route: 70 μm HDPE/LLDPE or HDPE/LDPE—SF polyurethane based adhesive (approx. 1.5 g/m$^2$)—20 μm MDO-PE with PVOH based barrier lacquer (approx. 1 g/m$^2$) and optional metallization 10 or metal oxide or ceramic layer 11—SF polyurethane based adhesive (approx. 1.5 g/m$^2$)—70 μm HDPE or mLLDPE or HDPE/LLDPE or HDPE/LDPE.

Figure 4:
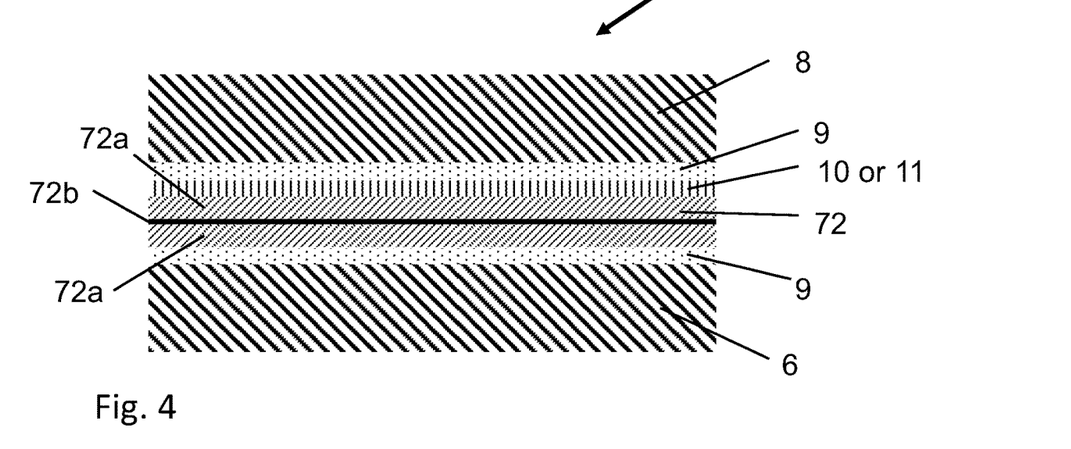
FIG. 4 is PE/MDO-PE-EVOH+metallization (or metal oxide or ceramic)/PE.

FIG. 4 shows a laminate with—from inside to outside—PE 6/adhesive 9/MDO-PE-EVOH 72 (PE-layers 72a and EVOH layer 72b)+metallization 10 or metal oxide or ceramic layer 11/adhesive 9/PE 8.

A presently preferred embodiment of the above material with a thickness of approx. 160 μm is composed as follows:

For the flexible route: 70 μm HDPE/LLDPE or HDPE/LDPE—SF polyurethane based adhesive (approx. 1.5 g/m$^2$)—20 μm MDO-PE-EVOH with optional metallization or metal oxide or ceramic layer—SF polyurethane based adhesive (approx. 1.5 g/m$^2$)—70 μm LDPE.

For the rigid route: 70 μm HDPE/LLDPE or HDPE/LDPE—SF polyurethane based adhesive (approx. 1.5 g/m$^2$)—20 μm MDO-PE-EVOH with optional metallization or metal oxide or ceramic layer—SF polyurethane based adhesive (approx. 1.5 g/m$^2$)—70 μm HDPE or mLLDPE or HDPE/LLDPE or HDPE/LDPE.

Figure 5:
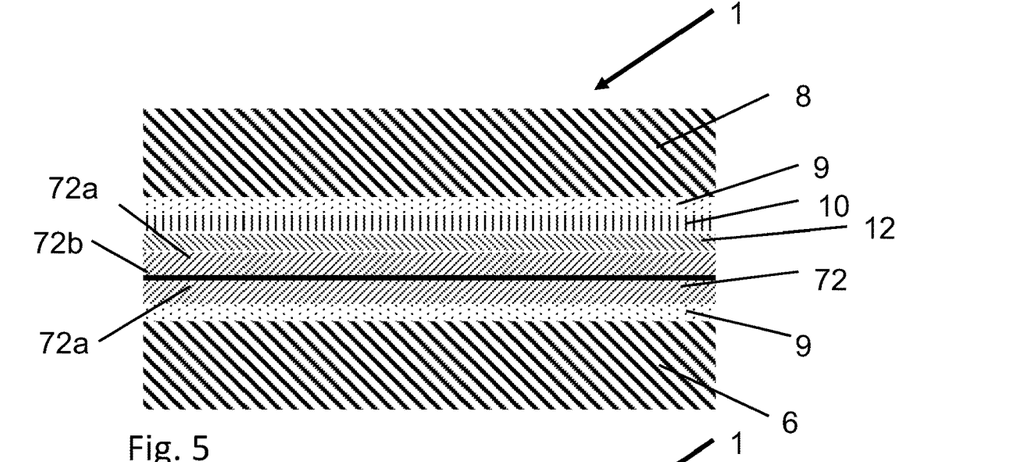
FIG. 5 is PE/MDO-PE-EVOH+lacquer+metallization (or metal oxide or ceramic layer)/PE.

FIG. 5 shows a laminate with—from inside to outside—PE 6/adhesive 9/MDO-PE-EVOH 72 (PE-layers 72a and EVOH layer 72b)+barrier lacquer 12+metallization 10 or metal oxide or ceramic layer 11/adhesive 9/PE 8.

A presently preferred embodiment of the above material with a thickness of approx. 160 μm is composed as follows:

For the flexible route: 70 μm HDPE/LLDPE or HDPE/LDPE—SF polyurethane based adhesive (approx. 1.5 g/m$^2$)—20 μm MDO-PE-EVOH with barrier lacquer (approx. 1 g/m$^2$) and with optional metallization 10 or metal oxide layer 11—SF polyurethane based adhesive (approx. 1.5 g/m$^2$)—70 μm LDPE.

For the rigid route: 70 μm HDPE/LLDPE or HDPE/LDPE—SF polyurethane based adhesive (approx. 1.5 g/m$^2$)—20 μm MDO-PE-EVOH with barrier lacquer (approx. 1 g/m$^2$) and with optional metallization 10 or metal oxide layer 11—SF polyurethane based adhesive (approx. 1.5 g/m$^2$)—70 μm HDPE or mLLDPE or HDPE/LLDPE or HDPE/LDPE.

In an alternative embodiment of FIG. 5 (not shown) the following sequence of the layers is present (from inside to outside): PE 6/adhesive 9/barrier lacquer 12 on MDO-PE-EVOH 72 (PE-layers 72a and EVOH layer 72b)+metallization 10 or metal oxide or ceramic layer 11/adhesive 9/PE 8.

Figure 6:
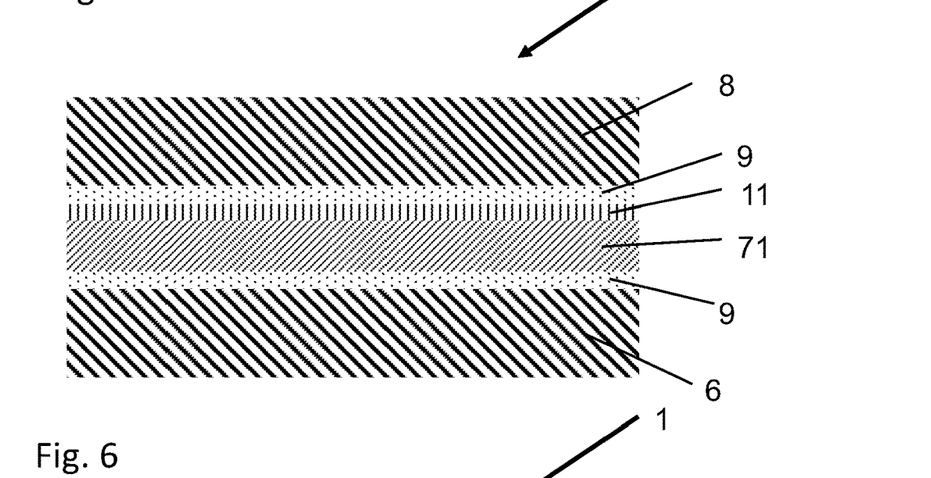
FIG. 6 is PE/OPP+AlxOy/PE.

FIG. 6 shows a laminate with—from inside to outside—PE 6/adhesive 9/OPP 71+metal oxide or ceramic 11/adhesive 9/PE 8.

A presently preferred embodiment of the above material with a thickness of approx. 160 μm is composed as follows:

For the flexible route: 70 μm HDPE/LLDPE or HDPE/LDPE—SF polyurethane based adhesive (approx. 1.5 g/m$^2$)—15-20 μm, such as 16-20 μm OPP with AlxOy or SiOx—SF polyurethane based adhesive (approx. 1.5 g/m$^2$)—70 μm LDPE.

For the rigid route: 70 μm HDPE/LLDPE or HDPE/LDPE—SF polyurethane based adhesive (approx. 1.5 g/m$^2$)—15-20 μm, such as 16-20 μm OPP with AlxOy or SiOx—SF polyurethane based adhesive (approx. 1.5 g/m$^2$)—70 μm HDPE or mLLDPE or HDPE/LLDPE or HDPE/LDPE.

Figure 7:
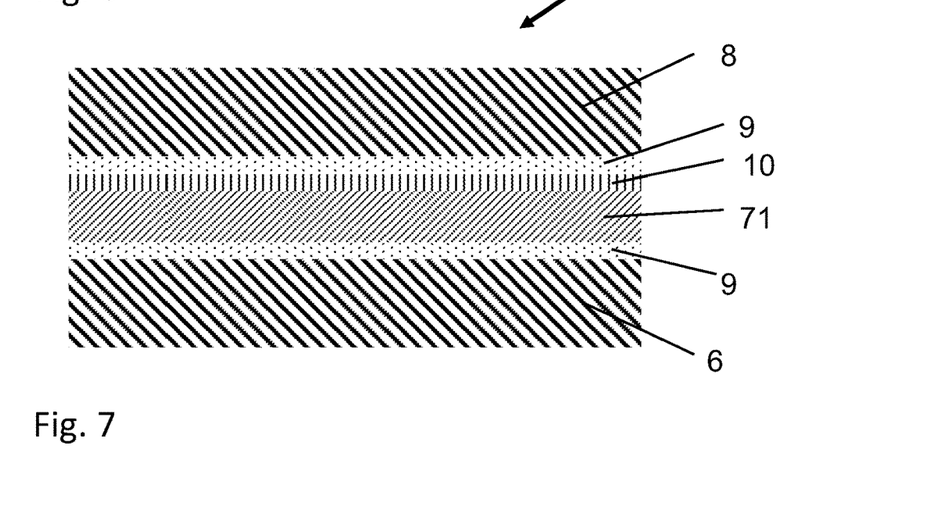
FIG. 7 is PE/OPP+metallization/PE.

FIG. 7 shows a laminate with—from inside to outside—PE 6/adhesive 9/OPP 71+metallization 10/adhesive 9/PE 8.

A presently preferred embodiment of the above material with a thickness of approx. 160 μm is composed as follows:

For the flexible route: 70 μm HDPE/LLDPE or HDPE/LDPE—SF polyurethane based adhesive (approx. 1.5 g/m²)—15-20 µm, such as 16-20 µm OPP—metallization—SF polyurethane based adhesive (approx. 1.5 g/m²)—70 µm LDPE.

For the rigid route: 70 µm HDPE/LLDPE or HDPE/LDPE—SF polyurethane based adhesive (approx. 1.5 g/m²)—15-20 µm, such as 16-20 µm OPP—metallization—SF polyurethane based adhesive (approx. 1.5 g/m²)—70 µm HDPE or mLLDPE or HDPE/LLDPE or HDPE/LDPE.

Figure 8:
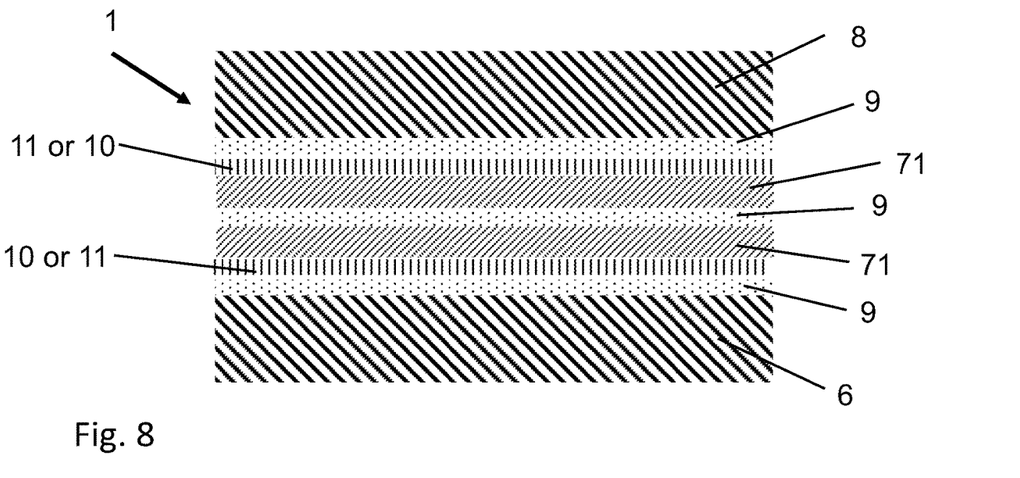
FIG. 8 is PE/OPP+metallization (or metal oxide or ceramic)/OPP+metal oxide or ceramic (or metallization)/PE.

FIG. 8 shows a laminate with a barrier layer that is a barrier foil laminate. In detail, FIG. 8 shows—from inside to outside: PE 6/adhesive 9/metallization 10 (or metal oxide or ceramic 11) on OPP 71/adhesive 9/OPP 71+metal oxide or ceramic 11 (or metallization 10)/adhesive 9/PE 8.

A presently preferred embodiment of the above material with a thickness of approx. 250 to 500 µm, such as 300 to 500 µm (comprising a LDPE sheathing) is composed as follows:

For the flexible route: 70 µm HDPE/LLDPE or HDPE/LDPE—SF polyurethane based adhesive (approx. 1.5 g/m²)—15-20 µm, such as 16-20 µm OPP with metallization (or AlxOy or SiOx)—SF polyurethane based adhesive (approx. 1 µm)—15-20 µm, such as 16-20 µm OPP with AlxOy or SiOx (or metallization)—SF adhesive (approx. 1.5 g/m²)—70 µm LDPE.

For the rigid route: 70 µm HDPE/LLDPE or HDPE/LDPE—SF polyurethane based adhesive (approx. 1.5 g/m²)—15-20 µm, such as 16-20 µm OPP with metallization (or AlxOy or SiOx)—SF polyurethane based adhesive (approx. 1 µm)–15-20 µm, such as –20 µm OPP with AlxOy or SiOx (or metallization)—SF adhesive (approx. 1.5 g/m²)—70 µm HDPE or mLLDPE or HDPE/LLDPE or HDPE/LDPE.

Figure 9:
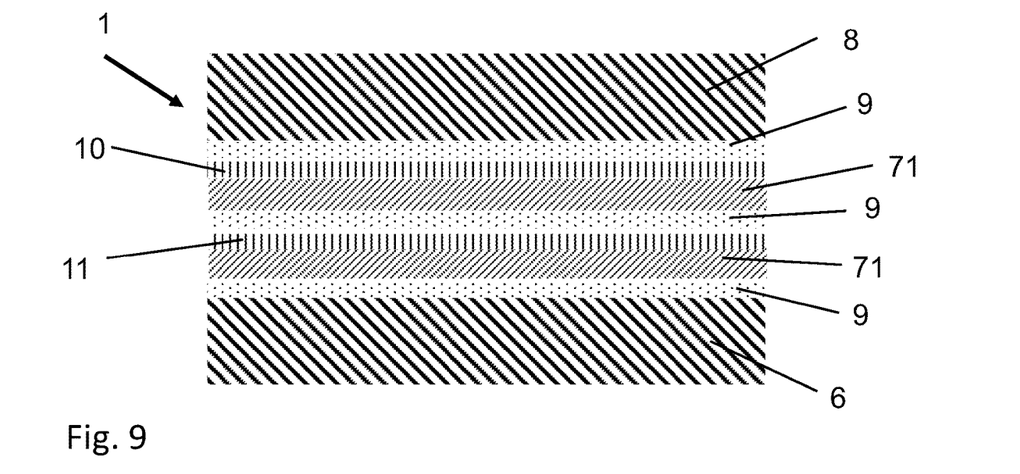
FIG. 9 is PE/OPP+metal oxide or ceramic/OPP+metallization/PE.

FIG. 9 shows a laminate with—from inside to outside—PE 6/adhesive 9/OPP 71+metal oxide or ceramic 11/adhesive 9/OPP 71+metallization 10/adhesive 9/PE 8.

In one embodiment, the above material with a thickness of approx. 250 to 500 µm, such as 300 to 500 µm is composed as follows:

For the flexible route: 70 µm HDPE/LLDPE or HDPE/LDPE—SF polyurethane based adhesive (approx. 1.5 g/m²)—15-20 µm, such as 16-20 µm OPP+AlxOy—SF polyurethane based adhesive (approx. 1.5 g/m²)—15-20 µm, such as 16-20 µm OPP with metallization—SF polyurethane based adhesive (approx. 1 µm)—70 µm LDPE.

For the rigid route: 70 µm HDPE/LLDPE or HDPE/LDPE—SF polyurethane based adhesive (approx. 1.5 g/m²)—15-20 µm, such as 16-20 µm OPP+AlxOy—SF polyurethane based adhesive (approx. 1.5 g/m²)—15-20 µm, such as 16-20 µm OPP with metallization—SF polyurethane based adhesive (approx. 1 µm)—70 µm HDPE or mLLDPE or HDPE/LLDPE or HDPE/LDPE.

Independent of the specific laminates outlined above, in a preferred embodiment for the flexible route, the inner PE-foil 6 is of a mixture of HDPE/LLDPE or HDPE/LDPE, preferably in a ratio of 30% to 70%, and the outer PE-foil 8 is of LDPE.

In another preferred embodiment, for the rigid recycling route, the inner PE-foil 6 is of a mixture of HDPE/LLDPE, preferably in a ratio of ≥80% HDPE and ≤20% LLDPE, and the outer PE-foil 8 is of HDPE/LDPE, preferably in a ratio of ≥80% HDPE and ≤20% LDPE.

In yet another preferred embodiment, the inner PE-foil 6 is a barrier foil composed of PE/tie/EVOH/tie/PE with the PE for the rigid recycling route being HDPE or HDPE/LLDPE or HDPE/LDPE, preferably in a ratio of ≥80% HDPE and ≤20% LLDPE or ≥80% HDPE and ≤20% LDPE, and for the flexible recycling route the PE is LDPE, LLDPE or HDPE/LDPE or HDPE/LLDPE with at most 30 HDPE.

Such an inner foil is especially suited for containers comprising a content with compounds the migration of which has to be prevented since they might affect one of the further layers, especially the laminating adhesive. Also with such an inner foil the outer PE-foil 8 is as described above.

In another embodiment for the flexible recycling route both, the inner PE-foil 6 and the outer PE-foil 8 are of MDPE.

With regard to the barrier effect, a coextruded barrier foil is preferred, namely a highly oriented EVOH layer with small thickness (1-3 µm) within a MDO (mono-directionally oriented) PE foil.

The barrier effect of any of the polymeric barrier foils can be enhanced by applying at least one functional layer selected from a barrier lacquer, a metallization like Al and/or a metal oxide or ceramic thin film barrier like AlxOy or SiOx.

The adhesive layers can be the same or different but preferably are the same and much preferred are two-component polyurethane based and solvent-free or water based adhesives.

While there are shown and described presently preferred embodiments of the invention, it is to be distinctly understood that the invention is not limited thereto but may be otherwise variously embodied and practiced within the scope of the following claims.

The invention claimed is:

1. A fluid-tight collapsible polyolefin container that comprises a container body formed of a container laminate, said container laminate being folded and sealed in overlapping edge regions, the container laminate having an outer surface coated with a sheathing of polyolefin material to form the container body, said container body being provided at one open end with a shoulder/head formed from polyolefin material, wherein said container laminate is a laminate having at least three layers, an inner polyolefin layer and an outer polyolefin layer and a barrier layer sandwiched between the outer polyolefin layer and the inner polyolefin layer, wherein the barrier layer comprises at least one, polyethylene comprising oriented barrier foil and said polyethylene comprising oriented barrier foil being coextruded and being a mono-directional oriented polyethylene-ethylene vinyl alcohol copolymer (MDO-PE-EVOH) foil with an EVOH layer between two PE-layers, or a PE-tie layer-EVOH-tie layer-PE foil, and wherein at least 90% by weight of the container is made of polyolefin of the same kind.

2. The collapsible container of claim 1, wherein the polyethylene comprising oriented barrier foil has a thickness in the range of 15 to 30 µm.

3. The collapsible container of claim 1, wherein the polyethylene comprising oriented barrier foil is provided with at least one functional layer on at least one of its surfaces, said one or more functional layers being selected from the group consisting of metal layers and metal oxide or ceramic layers and layers of barrier lacquers and combinations of a barrier lacquer and a metal layer and combinations of a barrier lacquer and a metal oxide or ceramic layer.

4. The collapsible container of claim 3, wherein the one or more functional layers have a thickness of 5 to 100 nm for metal or metal oxide or ceramic layers, and about 1 to 3 g/m² for cured barrier lacquer layers.

5. The collapsible container of claim 3, wherein the one or more metal layers are aluminum and/or the one or more metal oxide or ceramic layers are chosen from AlxOy and SiOx and/or the one or more layers of barrier lacquers are chosen from water insoluble polyvinyl alcohol based lacquers.

6. The collapsible container of claim 1, wherein the polyolefin is selected from polyethylene and polypropylene.

7. The collapsible container of claim 6, wherein the polyolefin is polyethylene selected from
   (i) HDPE or mLLDPE or HDPE/LLDPE or HDPE/LDPE with at least 80% HDPE or mLLDPE or
   (ii) LLDPE or LDPE or HDPE/LLDPE or HDPE/LDPE with at most 30% HDPE.

8. The collapsible container of claim 1, wherein at least 95% by weight of the container is made of polyolefin of the same kind.

9. The collapsible container claim 1, wherein at least 90% by weight, of the container laminate is made of polyolefin of the same kind.

10. The collapsible container of claim 1, wherein the inner polyolefin layer is a coextruded foil.

11. The collapsible container of claim 10, wherein the coextruded foil comprises an internal barrier layer.

12. The collapsible container of claim 11, wherein the coextruded foil comprises as internal barrier layer an EVOH layer, said coextruded foil being a PE-tie layer-EVOH-tie layer-PE foil.

13. The collapsible container of claim 1, wherein the outer polyolefin layer is a coextruded foil.

14. A container body for a collapsible container of claim 1 with a container laminate that is a laminate having at least three layers, an inner polyolefin layer and an outer polyolefin layer and a barrier layer sandwiched between the outer polyolefin layer and the inner polyolefin layer, wherein the barrier layer comprises at least one polyethylene comprising oriented barrier foil, said polyethylene comprising oriented barrier foil being coextruded, and being a mono-directional oriented polyethylene-ethylene vinyl alcohol copolymer (MDO-PE-EVOH) foil with an EVOH layer between two PE-layers, or a PE-tie layer-EVOH-tie layer-PE foil, and said container body being provided with a sheathing of polyolefin, wherein at least 90% by weight of the container body is made of polyolefin of the same kind.

15. The container body for a collapsible container of claim 14, wherein the polyolefin is polyethylene selected from
   (i) HDPE or mLLDPE or HDPE/LLDPE or HDPE/LDPE with at least 80% HDPE or mLLDPE or
   (ii) LLDPE or LDPE or HDPE/LLDPE or HDPE/LDPE with at most 30% HDPE.

16. A container laminate for the collapsible container of claim 1 that is a laminate having at least three layers, an inner polyolefin layer and an outer polyolefin layer and a barrier layer sandwiched between the outer polyolefin layer and the inner polyolefin layer, wherein the barrier layer comprises at least one polyethylene comprising oriented barrier foil, said polyethylene comprising oriented barrier foil being coextruded, and being a mono-directional oriented polyethylene-ethylene vinyl alcohol copolymer (MDO-PE-EVOH) foil with an EVOH layer between two PE-layers, or a PE-tie layer-EVOH-tie layer-PE foil, and wherein at least 90% of the container laminate is made of polyolefin of the same kind.

17. The container laminate for a collapsible container of claim 16, wherein the polyolefin is polyethylene selected from
   (i) HDPE or mLLDPE or HDPE/LLDPE or HDPE/LDPE with at least 80% HDPE or mLLDPE or
   (ii) LLDPE or LDPE or HDPE/LLDPE or HDPE/LDPE with at most 30% HDPE.

18. The collapsible container of claim 1, wherein the polyethylene comprising oriented barrier foil has a thickness of about 20 μm.

19. The collapsible container of claim 3, wherein the one or more functional layers have a thickness of 20-80 nm for metal or metal oxide or ceramic layers.

20. The collapsible container of claim 3, wherein the one or more functional layers have a thickness of about 50 nm for metal or metal oxide or ceramic layers.

21. The collapsible container of claim 3, wherein the one or more functional layers have a thickness of about 1 to 2 $g/m^2$ for cured barrier lacquer layers.

22. The collapsible container claim 1, wherein at least 95% by weight of the container laminate is made of polyolefin of the same kind.

23. A container body for a collapsible container of claim 1 with a container laminate that is a laminate having at least three layers, an inner polyolefin layer and an outer polyolefin layer and a barrier layer sandwiched between the outer polyolefin layer and the inner polyolefin layer, wherein the barrier layer comprises at least one polyethylene comprising oriented barrier foil, said polyethylene comprising oriented barrier foil being coextruded, and being a mono-directional oriented polyethylene-ethylene vinyl alcohol copolymer (MDO-PE-EVOH) foil with an EVOH layer between two PE-layers, or a PE-tie layer-EVOH-tie layer-PE foil, and said container body being provided with a sheathing of polyolefin, wherein at least 95% by weight of the container body is made of polyolefin of the same kind.

* * * * *